United States Patent [19]
Binns et al.

[11] Patent Number: 5,793,372
[45] Date of Patent: Aug. 11, 1998

[54] METHODS AND APPARATUS FOR RAPIDLY RENDERING PHOTO-REALISTIC SURFACES ON 3-DIMENSIONAL WIRE FRAMES AUTOMATICALLY USING USER DEFINED POINTS

[75] Inventors: Bruce W. Binns, Melbourne Beach, Fla.; Charles S. Palm, Westlake Village, Calif.; Suzanne E. Weaver, Melbourne Beach, Fla.

[73] Assignee: Synthonics Incorporated, Westlake Village, Calif.

[21] Appl. No.: 327,471

[22] Filed: Oct. 21, 1994

[51] Int. Cl.$^6$ .................................................. G06T 17/40
[52] U.S. Cl. ........................... 345/419; 345/425; 345/430
[58] Field of Search ........................... 395/118–120, 126, 395/129, 123, 130; 345/418–423, 425, 426, 429, 430, 433–39; 352/59–63; 364/578; 382/173, 192, 194–5, 285

[56] References Cited

U.S. PATENT DOCUMENTS

| | | | |
|---|---|---|---|
| 4,734,756 | 3/1988 | Butterfield et al. | 358/3 |
| 5,621,867 | 4/1997 | Murata et al. | 345/430 |
| 5,649,081 | 7/1997 | Nakajima et al. | 345/430 |
| 5,687,307 | 11/1997 | Akisada et al. | 345/437 |
| 5,696,892 | 12/1997 | Redmann | 345/425 |

OTHER PUBLICATIONS

Foley, James D., et al, "Computer Graphics: Principles and Practices", Addison–Wesley Publishing Co., 2nd ed., pp. 33–37, 473–477, 741–749 and 799–800, (1990).

Aritake, Toshiyunki et al, "Dynamic Display of Facial Expressions for Active Human Interface", *Robot and Human Communication*, 1994 International Workshop, pp. 174–179, Jul. 1994.

Kweon, So et al, "High–Resolution Terrain Mapping from Multiple Sensor Data", *IEEE Transactions on Pattern Analysis and Machine Intelligence*, Feb. 1992, vol. 14, Iss. 2, pp. 278–292.

Braccini, C. et al, "Muscle Modeling for Facial Animation in Videophone Coding", *Robot and Human Communication*, 1992 International Workshop, pp. 369–374.

Ohya, Jun et al., "Real–time Reproduction of 3D Human Images in Virtual Space Teleconferencing", *Virtual Reality, 1993 International Symposium*, pp. 408–414.

Shepherd, Barry, "Applying Visual Programming to Robotics", *Robotics and Automation, 1993 IEEE International Conference*, pp. 707–712.

Sakaguchi, Tatsumi, "Analsis and Synthesis of Facial Expression Using High–Difinition Wire Frame Model", *Robot and Human Communications, 1993 International Workshop*, pp. 194–199.

David F. Rogers, J. Alan Adams, "Mathematical Elements for Computer Graphics", Second Edition, (1990), 184–207.

David Kirk, Editor, "Gems III", Academic Press, 1992, pp. 213–218, 256–261.

Robert, L., ei al, "Realative 3D Positioning and 3D Convex Hull Computation from a Weakly Calibrated Stereo Pair", *Computer Vision, 1993 4th International Converence*, 4/39, pp. 540–544.

Gemmerle, D., et al., "Construction of 3D Views From Stereoscopic Triplets of Images", *IEEE International Conference on Image Processing*, vol. 2, Nov. 13–16, 1994, pp. 715–719.

Wang, Jin–Yinn; Cohen, Fernand S, "3–D Object Recognition and Shape Estimation from Image Contours Using B–splines, Shape Invariant Matching, and Neural Network" *IEEE Transactions on Pattern Analysis and Machine Intelligence* v. 16, Jan. 1994, pp. 13–23.

Pratt, William K., "Digital Image Processing", John Wiley and Sons, 2ed., 1991, pp. 557–627.

*Primary Examiner*—Rudolph J. Buchel, Jr.
*Attorney, Agent, or Firm*—McDermott, Will & Emery

[57] ABSTRACT

Automatic photographic color rendering of the surfaces of wire frame representation of 3-dimensional objects is described. Bit mapped information of surface areas is captured as part of image processing in the creation of wire frames into the computer. When a wire frame is transformed to a different orientation, the rendering surfaces are automatically transformed and the wire frame can be rendered in the new orientation with photographic quality.

10 Claims, 6 Drawing Sheets

| Point (VERTEX) | COORDINATES IN OBJECT SPACE 410 | DATA BASE FIRST VERTEX OF TRIANGLE 420 | BITMAP POINTER FOR TRIANGLE 430 | | |
|---|---|---|---|---|---|
| | | | Image | X Value | Y Value |
| 1 | $X_1 Y_1 Z_1$ | 125 | 1 | 095 | 142 |
| 2 | $X_2 Y_2 Z_2$ | | | | |
| 3 | $X_3 Y_3 Z_3$ | | | | |
| 4 | | | | | |
| 5 | | | | | |
| 6 | | | | | |
| 7 | | | | | |
| . . . | | | | | |
| n | | | | | |

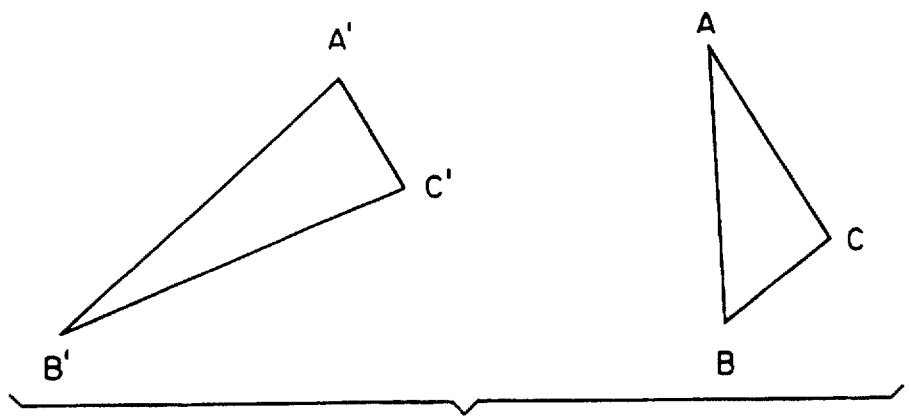

Figure 6

```
┌─────────────────────────────────────┐
│  TRANSFORM TRIANGLE ABC (FIGURE 6)  │
│           TO A'B'C'                 │
└─────────────────────────────────────┘
                  │
┌─────────────────────────────────────┐
│   TRANSFORM SHAPE OF STORED BIT MAP │
└─────────────────────────────────────┘
                  │
┌─────────────────────────────────────┐
│ FOR EACH PIXEL IN THE VISIBLE PORTION│
│  OF THE OBJECT, ASSIGN A COLOR VALUE │
│   FROM PIXEL(S) IN STORED BIT MAP    │
└─────────────────────────────────────┘
```

Figure 7

METHODS AND APPARATUS FOR RAPIDLY RENDERING PHOTO-REALISTIC SURFACES ON 3-DIMENSIONAL WIRE FRAMES AUTOMATICALLY USING USER DEFINED POINTS

CROSS REFERENCE TO RELATED APPLICATIONS

This application is related to application Ser. No. 08/318, 047, filed Oct. 4, 1994 by Bruce W. Binns et al. and entitled "METHOD AND APPARATUS FOR INTERACTIVE IMAGE CORRELATION FOR 3-DIMENSIONAL IMAGE PRODUCTION".

1. TECHNICAL FIELD

This application relates to the field of image processing and more particularly to the field of rendering surfaces on wire frame representations of 3-dimensional objects.

2. BACKGROUND ART

Representing 3-dimensional objects for computer manipulation using a wire frame representation is well known in the art. In these techniques, a number of points on the surface of the object to be represented are identified and a calculation or measurement made of the position of each of those points to identify their location in some 3-dimensional coordinate system. Typically, each identified point is joined with its nearest neighbors by lines or "wires". This process can be analogize to pressing chicken wire against a 3-dimensional surface and allowing it to deform so that the intersections of the wires represent points on the surface of the 3-dimensional object. An object may be represented with whatever degree of fidelity desired by the changing the spacing of the points; in other words, by adapting the resolution with which points on the surface are stored. Continuing the analogy, the areas enclosed by wire boundaries correspond to elemental surface elements. Depending on how the chicken wire is constructed, these elements may be triangular, rectangular, hexagonal or in the shape of any other polygon.

Once a 3-D representation of an object is captured by recording the coordinates of each point (vertex) of the wire frame, and displayed as a wire frame image, the wire frame can be utilized to do a number of interesting things. For example, the 3-dimensional representation may be rotated, the perspective from which the object is viewed changed, or specific parts of the wireframe changed incrementally as part of creating an animation of the object.

When viewing a wire frame, the prior art has evolved a number of techniques for making the wire frame appear more realistic. These include eliminating the transparent nature of a wire frame so that a viewer sees only the portion of the wire frame which would be visible when viewing the wire frame from a particular perspective and eliminating those lines and vertices which would be hidden by the surface in front. Even with that problem solved, the appearance of an object represented as a wire frame is singularly unnatural.

To make a wire frame representation appear more natural it is possible in the prior art to import the wire frame into a software package, select particular surface elements one at a time and apply a surface texture to the surface elements in a process called rendering. Typically, the wire frame surface element will be selected and painted with a pattern of pixels which approximated a desired surface texture for the area. A number of standard textures are typically defined in prior art rendering packages which would represent a pallete from which a particular texture could be selected and applied to surface elements of the wire frame.

The process of rendering a surface over a wire frame was extremely labor intensive. A particular surface element was selected and a particular texture linked to it. The linking proceded surface element by surface element until the entire image was covered.

Images rendered in this way suffered a loss of detail that made them appear unnatural. An unnatural appearance was particularly noticeable when creating and rendering wire frames of a human face. The limited textures available, gave a human face an unnatural plastic like appearance which failed to capture the many details and imperfections that rendered individuals uniquely human. The rendering techniques of the prior art did not result in photographic quality. They resulted in loss of detail and an unnatural appearance which limited their use in computer animations of human representations.

In view of the above, it would be desirable to render surfaces of wire frame representations of 3-dimensional objects in a way which is automatic, of photographic quality and very natural.

DISCLOSURE OF THE INVENTION

Accordingly, one advantage of the invention is to render the surfaces of a wire frame with photographic quality and realism.

Another advantage of the invention is to render the surface of wire frames without the loss of detail found in the prior art.

Another advantage of the invention is to permit automatic rendering the 3-dimensional wire frames and thus avoid the laborious manual process of the prior art.

These and other objects of the invention are achieved by methods and apparatus which render a surface on a wire frame representation of a 3-dimensional object for which at least one image of the object is available by defining pixel panels representing a substantially planar surface of said object. The pixel panels are defined by specifying a plurality of points on an image of said object in a closed path around the planar surface. The panels are partitioned into discrete surface elements (preferably triangular) and a bit map from an image with a corresponding triangular surface element is stored for selective application to that surface element when rendering a surface on a wire frame.

When two (e.g. a left and a right) or more images of the object are available, a bit map from any of the images may be selected depending on a selection criterion such as which view is more nearly perpendicular to the viewing plane or to the line of the perspective view.

The invention is also directed to methods and apparatus for rendering a surface on a wire frame representation of a 3-dimensional object for which at least one image of the object is available by defining pixel panels representing a substantially planar surface of said object. The panels are defined by specifying a plurality of points on an image of said object in a closed path around the planar surface and storing location information for each point specified in a database. The pixel panels are partitioned into discrete surface elements and a pointer from one or more surface elements is stored in said database to a bit map from an image for selective application to the surface element as part of a surface when rendering a surface on a wire frame.

Still other objects and advantages of the present invention will become readily apparent to those skilled in the art from the following detailed description, in which only the preferred embodiment of the invention is shown and described, simply by way of illustration of the best mode contemplated of carrying out the invention. It will be realized that the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 4 is a 3-dimensional data base for storing wire frame rendering information.

FIG. 6 depicts a triangular surface element before and after a perspective change.

FIG. 7 is a flow chart of how to transform one triangle of a 3-dimensional object and render the transformed triangular surface element.

BEST MODE FOR CARRYING OUT THE INVENTION

Figure 1:
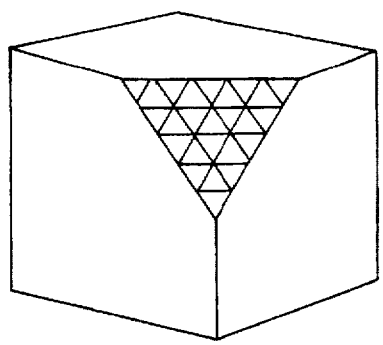
FIG. 1 is a 3-dimensional object with one surface illustrated as a wire frame.

FIG. 1 illustrates a 3-dimensional cube 100 with one corner removed. All of the surfaces except for the surface exposed at the removed corner are depicted as if the wire frame underneath had already been covered with a surface skin. Surface 110, however, is illustrated as a wire frame without any covering skin. The wire frame defines the shape of the 3-dimensional object and rendering produces a covering for the shape defined by the wire frame.

Figure 2:
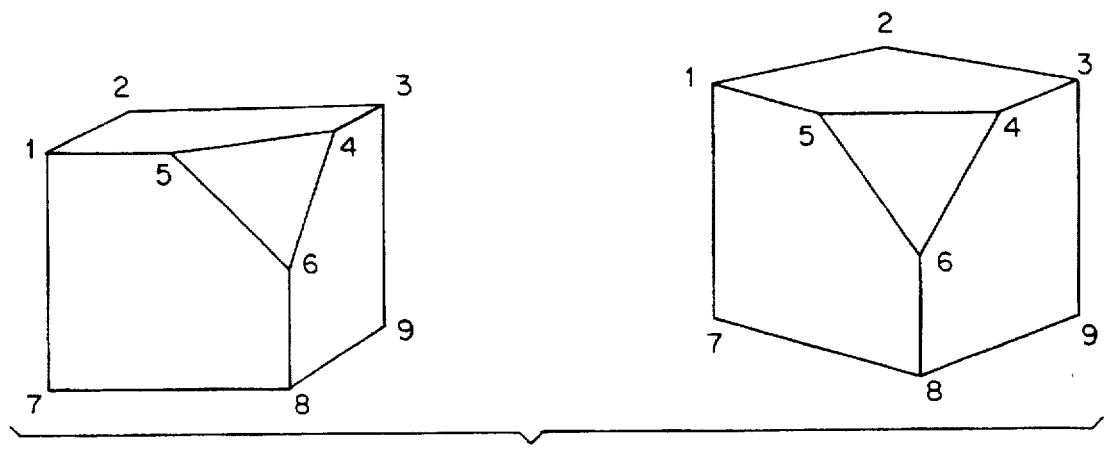
FIG. 2 contains a left and a right image of an image pair used to illustrate the invention.

FIG. 2 illustrates left and right images of a common scene, viewed from different perspectives. Each image of the image pair is preferably a high resolution electronic image such as might be captured with an electronic still camera or with frame grabbers from a video camera in the manner set forth in U.S. patent application Ser. No. 08/318,047 referred to above. Preferably the images are captured using a single camera operated from two different, known positions. The camera settings and orientations are preferably also known since calculations are thereby simplified.

Corresponding points on the left and right versions of the images are identified sequentially such that point 1 is identified in both left and right images, followed by point 2 in the left and right image, followed by point 3 in the left and right image and so forth. The first three pairs of points are utilized to define a calibrated target and are also define a coordinate system in 3-dimensional object space which serves as a reference point for all other points on the image.

Surfaces are defined by selecting points which define a closed path in a single plane. Even in regions which are highly non-planar, substantially planar regions can be identified by specifying smaller and smaller regions until the variation from truly planar is insignificant. In the example shown in FIG. 2, points are selected in the number order illustrated. The following closed paths are defined in order:

```
1-2-3-4-5
4-5-6
1-7-8-6-5
3-4-6-8-9
```

Each closed path is called a pixel panel. The selection of points occurs in the traditional way by selecting a point with a cursor and by clicking on the point. It should be clear that an arbitrary curvilinear line may be approximated by a series of points along the line. The more points per unit of length, the smoother the approximation would be.

From the left and right views, which are respective 2-dimensional representations of the object viewed from different perspectives, depth information, Z, can be calculated as set forth in the above-identified patent application Ser. No. 08/318,047.

The calculation of vertices for the wire frames is well known in the art. One way for doing that using left and right images from an image pair such as shown in FIG. 2 as set forth in patent application Ser. No. 08/318,047 referred to above.

Figure 3:
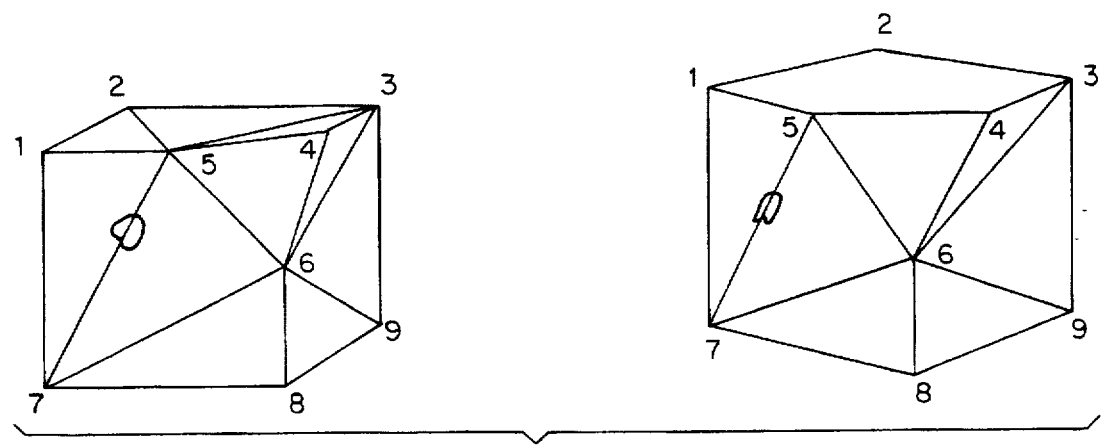
FIG. 3 partitions the pixel panels of the images of FIG. 2 into triangular surface elements.

Once the shape of an object has been represented in a wire frame, each pixel panel is partitioned into triangular surface elements as shown in FIG. 3. Although in the preferred mode, these polygons are triangular, in other modes, they may be rectangular, hexagonal or the like. A triangular polygon is preferred because the three vertices are guaranteed to lie in a plane. When using polygons of order greater than three, special steps may be required to ensure that all of the vertices lie within a common plane. Essentially, higher order polygons can be reduced to triangles (polygons of order 3) for convenience in processing. For later reference, surface irregularity 300 exists along the line joining vertices 5 and 7 of the left and right images of FIG. 3.

As shown in FIG. 3, the pixel panels of FIG. 2 are partitioned into triangular regions or surface elements. Preferably this is done automatically. For example, points 1, 2, and 3 of FIG. 2 would be selected and XYZ coordinates stored for the vertices of the triangle 123. A second triangle then could be selected by choosing sequentially points 3, 4 and 5. A third triangle on the upper surface could be identified as points 1, 5 and 6 as a process of triangular partitioning of the surface would continue until all of the surface triangles were defined. Referring to FIG. 3, the following triangular surface elements are associated with the corresponding pixel panels as follows:

| |
|---|
| pixel panel 1 triangle 125 |
| pixel panel 1, triangle 235 |
| pixel panel 1 triangle 345 |
| pixel panel 2, triangle 456 |
| pixel panel 3 triangle 157 |
| pixel panel 3, triangle 567 |
| pixel panel 3 triangle 678 |
| pixel panel 4, triangle 346 |
| pixel panel 4 triangle 369 |
| pixel panel 4, triangle 689 |

As shown in FIG. 4, the database includes field 400 which stores vertex identification numbers, field 410 which stores the coordinates of each vertex in object space, field 420 which indicates, if that vertex is the first vertex of a triangle, the identity of the triangle and field 430 which stores a pointer which points to the location of a bitmap of pixels. Preferably, the pixels are stored as 24 bit color pixels.

The pointer may point to any one of several possible sources of pixels for inclusion in a surface rendering. One option is to point to the triangular area of one of the left or right images of the image pair from which the wire frame is created. Another option is to point to a separate storage area where normalized (direct frontal view) bitmaps for each triangle are stored. Another option is to point to a higher resolution version of the image used to create the wire frame. Still another option is to point to a totally unrelated pattern which might be useful in creating special effects.

By storing such a pointer, the actual pixels from an original image can be stored for use in creating a photo realistic surface to be applied to the wire frame at the triangle's location. Thus, by associating in a database bit maps from an image with surface elements of the wire frame, the bit maps can be applied directly to the triangles in a very quick fashion. However, when the wire frame is rotated, the shape of the triangle changes and corresponding changes, set forth hereinafter, need to be made to the bit map stored for rendering.

With data arranged thus, whenever the position of a wire frame is transformed from one orientation to another, the new position can be quickly and automatically rendered by merely transforming the stored bit map as set forth herein to map the pixels from the stored bit map to the screen resulting in capture of all the detail originally contained in the original images. Surface irregularity 300 shown in FIG. 3 would be captured by this technique whereas it would be lost by prior art rendering packages.

The benefits of the invention are particularly noticeable in an animation application where changes to the wire frame can be automatically covered with a surface. In animation, when changing views, it may be necessary to abruptly change the image selected as the source of the bit map. To smooth this transition, one may prefer to morph from one bit map to another.

Figure 5:
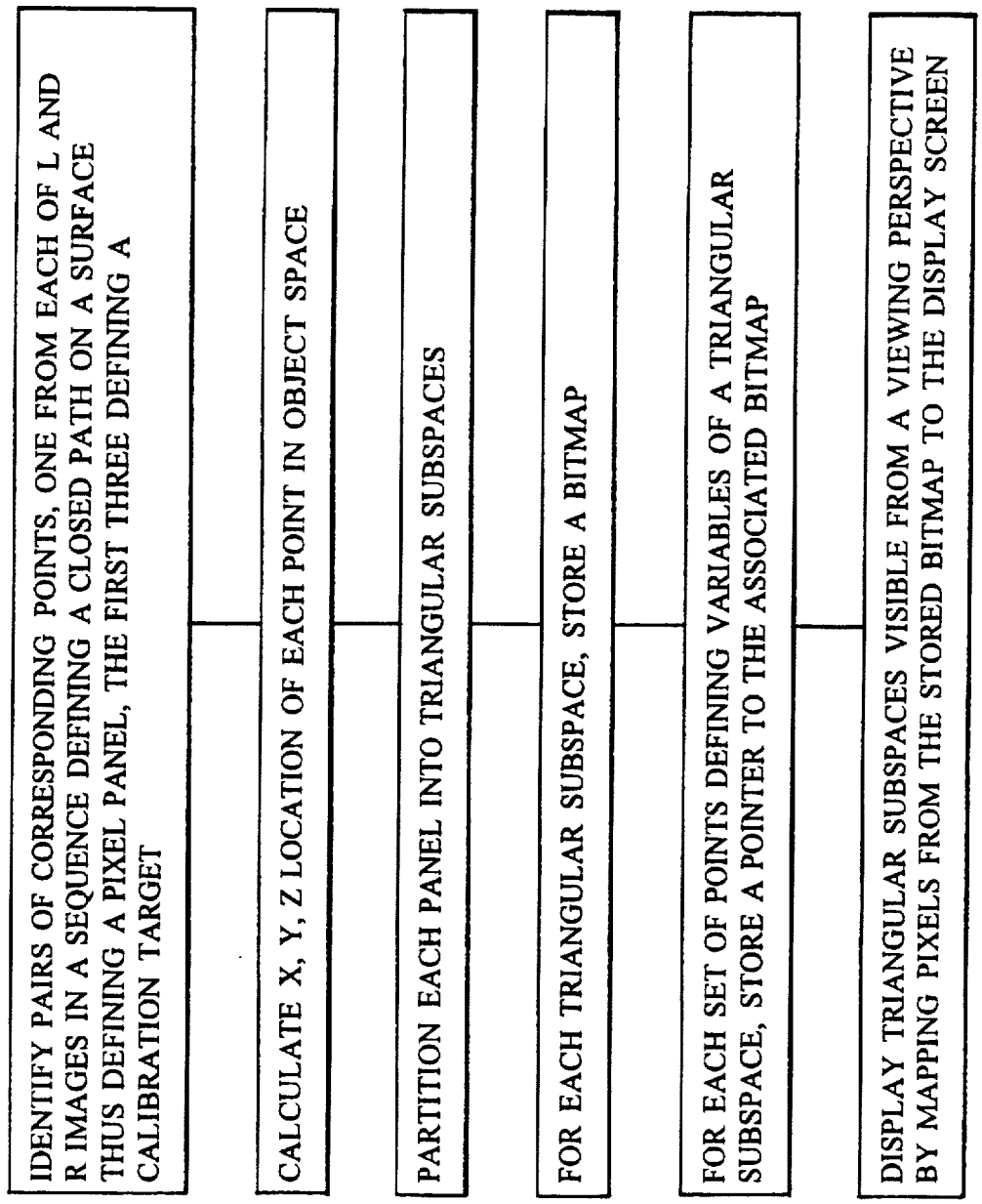
FIG. 5 is a flow chart of the preferred technique for creating a wire frame and rendering it.

A flow chart of the process just described is shown in FIG. 5.

When a wire frame is subject to an image transformation, such as rotation, the perspective view of the triangle changes resulting in a different shape when projected on to the viewing plane. Thus, points ABC of a triangle element of a wire frame may be translated into points A', B' and C' as shown in FIG. 6. Thus, the pixel address for points ABC are translated into different pixel addresses for points A'B'C'. The techniques for transformation are well known in the art. For example, such techniques are found in Mathematical Elements for Computer Graphics, second edition, by David F. Rogers and Alan Adams published in 1990.

The following procedure is followed to define pixels for line segments (vectors) corresponding to sides of a triangle.

For each Y value, $Y_i$, representing a row of pixels including $Y_A$, $Y_B$ and Y values in between, where $N=(Y_B-Y_A)/R_Y$, and where $R_y$ represents the resolution in the Y direction, calculate:

$$X_i = (Y_B - Y_A)/m = (Y_B - b)/[(Y_B - Y_A)/(X_B - X_A)]$$
$$= [(Y_B - b)/(X_B - X_A)]/(Y_B - Y_A)$$
$$Y_i = \text{address of a vertical row of pixels}$$

Thus each adjacent pair of verticies of triangle ABC forms a line segment or vector. Solving for b for each pair results in three sets of XY pairs defining the sides of the triangle.

To get the color value of the pixels, for each pixel having an address such that $$X_{min} < X < X_{max}$$

and $$Y_{min} < Y < Y_{max}$$

determine if a pixel is a pixel interior to the triangle by determining if the following inequalities are simultaneously satisfied:

$$Y < m_{AB}X + b_{AB}$$
$$y < m_{AC}X + b_{AC}$$
$$y > m_{BC}X + b_{BC}$$

If a pixel is interior, assign a color value to it as follows:

Take the color value from the pixel or set of pixels near point X,Y (defined next) in the stored bit map and assign it to pixel X'Y' in the transformed space. Preferably, the color value is an average of color values of pixels in the neighborhood of X,Y in the stored bit map. The values for X, Y are:

$$X = |(X'-X'_{min})/(X'_{max}-X'_{min})|(X_{max}-X_{min})|\text{int}$$

and $$Y = |(Y'-Y'_{min})/(Y'_{max}-Y'_{min})|(Y_{max}-Y_{min})|\text{int},$$

where $|\ldots|_{int}$ stands for the "integer value of" operator.

It may be that in some views, certain surfaces are viewed so obliquely that very few pixels are available to form a bit map for that surface. Under such circumstances, it may be desirable to select the view of the surface from the left or right image which is most nearly normal to the viewing plane.

Figure 8:
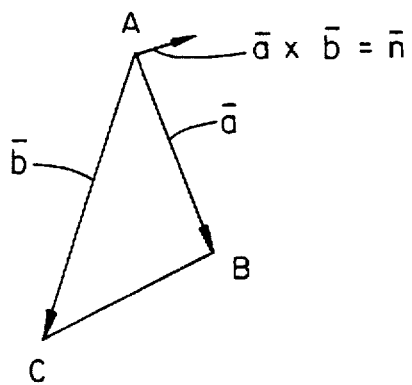
FIG. 8 illustrates how to calculate a normal vector for a triangular surface element.

Since the coordinates of the vertices in the wire frame representation are known, the sides of a triangle may be represented in vector form. By taking the cross product of two vectors from adjacent sides of the triangle as illustrated in FIG. 8, one obtains a perpendicular vector which can be normalized. By taking a dot product of a vector normal to the triangle with a vector normal to the viewing plane, one can determine whether or not the bit map from the left image or the right image is more normal to the viewing plane. Specifically, the dot product of two vectors is an indication of the cosine of the angle between the vectors. Thus, by forming the dot product of a unit vector generated by the cross product of two sides of a triangle from each of the left and right views of the same triangle, with the vector normal to the viewing plane, and by choosing the largest value (closer to 0 angle) one can select the most normal bit map for inclusion in the rendering database.

Figure 9:
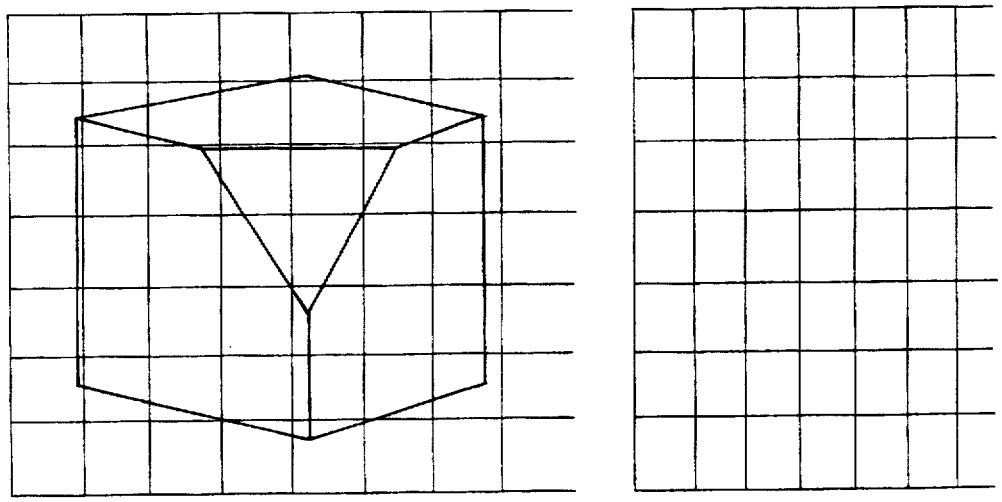
FIG. 9 shows a use of the invention in performing special effects image transformations.
Figure 10:
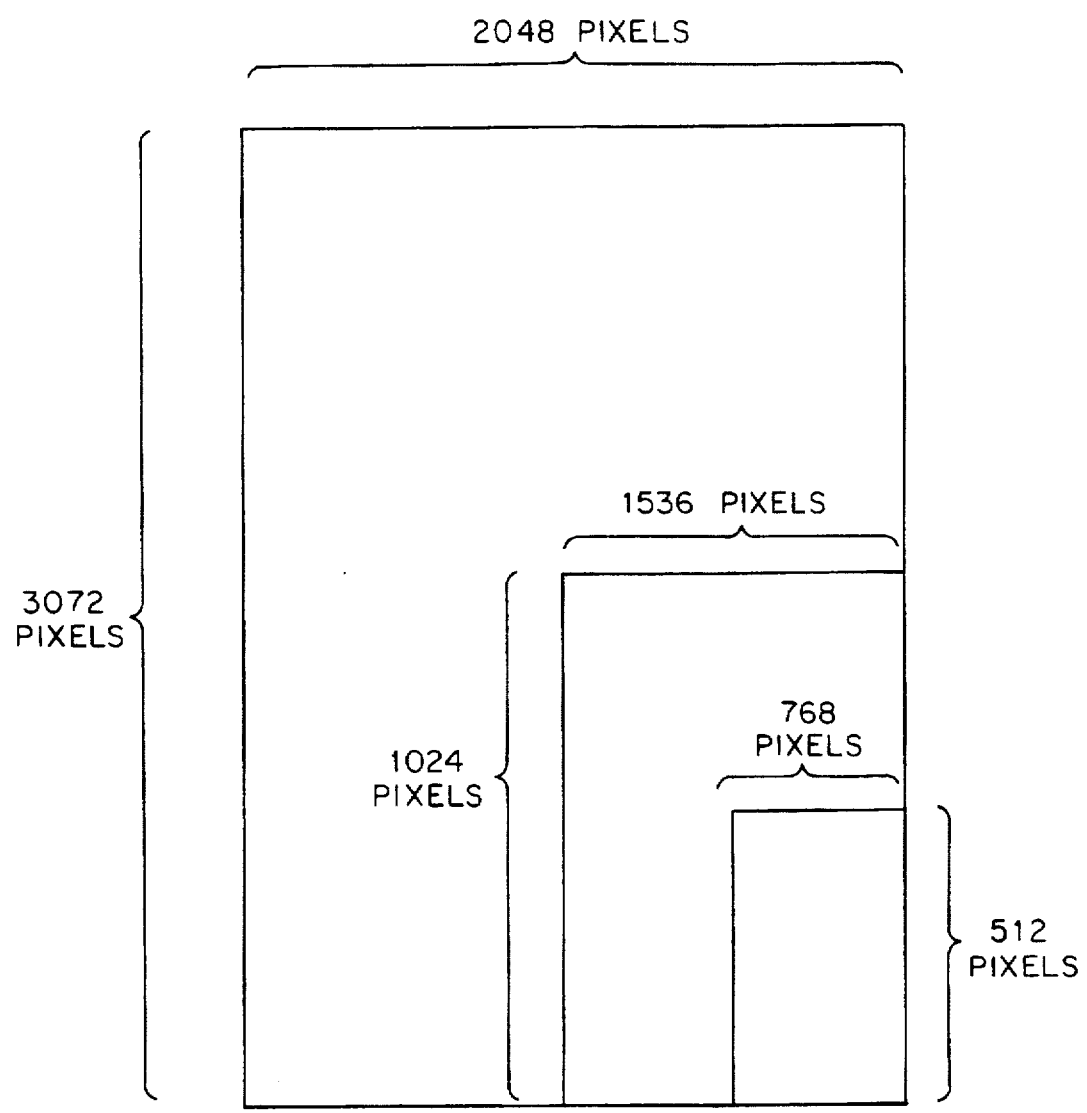
FIG. 10 shows how the same image may be available in versions of different resolution.

The pointer used in pointing to bit maps from a photographic quality image can also be used to point an unrelated image. This is illustrated in FIG. 9 where the right image has been replaced with an arbitrary plaid pattern. In FIG. 9 it is possible to apply the pattern from the right image selectively to all pixels within the image displayed on the left view. When initially done, each triangle would reflect bits which form part of a complete pattern. However, each of those pixels is associated with the triangular surface element of rendering database. As the object rotates or moves, the surface triangles would be transformed into different positions and shapes and the boundaries between the triangular regions would become apparent as a translation and rotation became more and more severe. As a result, an image which was originally indistinguishable from a background pattern will emerge as the 3-dimensional representation of the wire frame becomes distinct from the background.

One feature of the invention relates to the resolution at which the bit maps are stored. As shown in FIG. 8, although images displayed have only one resolution, the image may well be stored at one or more different resolutions. Thus, resolutions at 2 times, 4 times and 16 times the display resolution may be available for selecting pixels values for surface rendering with 3-dimensional wire frame. Thus, very precise shading can be obtained by using various averages of pixels over a desired resolution.

By associating bit maps of photographic quality with surface elements of a wire frame, one can achieve photo-realistic rendering of wire frame computer representations of 3-dimensional objects. It also allows the rendering data base to be captured as part of image processing which relates to capture of the wire frame. As indicated herein, the disadvantages of the prior art are thus overcome resulting in a rendering tool which provides very fast rendering of 3-dimensional wire frames regardless of their orientation.

In this disclosure there is shown and described only the preferred embodiment of the invention. Thus, as aforementioned, it is to be understood that the invention is capable of use in various other combinations and environments and is capable of changes and modifications within the scope of the inventive concept as expressed herein.

What is claimed is:

1. A computer implemented method of creating a wire frame representation of a 3-dimensional object for which a left image and a right image of the object are available and rendering a surface on said wireframe, comprising:
   a. defining respective pixel panels on the left and right images, each representing a substantially planar surface of said object, by specifying a plurality of corresponding points on the left and right images of said object in a sequence which forms a closed path around the planar surface;
   b. partitioning said pixel panels into triangular surface elements;
   c. defining a wireframe by calculating locations of each vertex of surface elements in a 3-dimensional object space using left and right images; and
   d. associating a bit map from either the left or right image with a corresponding surface element for selective application to the surface element as part of a surface when rendering a surface on a wire frame.

2. A computer implemented method of rendering a surface on a wire frame representation of a 3-dimensional object for which at least two images of the object is available, comprising:
   a. defining pixel panels each representing a substantially planar surface of said object by specifying a plurality of corresponding points on said images of said object using a graphical user interface in an order which forms a closed path around the planar surface;
   b. partitioning said pixel panels into discrete surface elements;
   c. associating at least one bit map from an image with a respective surface element for selective application to the surface element as part of a surface when rendering a surface on a wire frame.

3. The method of claim 2 in which the perspective view of the object is transformed from an original perspective to a transformed perspective, further comprising:
   a. transforming the shape of discrete surface elements from an original perspective to a transformed perspective.
   b. for each pixel within the transformed triangular surface element, assigning a value based on one or more pixels at corresponding locations of the bit map associated with the discrete surface element.

4. A computer implemented method of rendering a surface on a wire frame representation of a 3-dimensional object for which at least two images of the object are available, comprising:
   a. defining pixel panels representing a substantially planar surface of said object by specifying a plurality of corresponding points on two images of said object using a graphical user interface in an order which forms a closed path around the planar surface and storing location information for each point specified in a database;
   b. partitioning said pixel panels into discrete surface elements; and
   c. for one or more surface elements, storing a pointer in said database to a bit map for selective application to the surface element as part of a surface when rendering a surface on a wire frame.

5. The method of claim 4 in which the pointer points to locations on a set of pixel maps of varying levels of resolution.

6. The method of claim 4 in which the pointer points to pixel maps from an unrelated image.

7. Computer apparatus for rendering a surface on a wire frame representation of a 3-dimensional object for which at least two images of the object are available, comprising:
   a. a user interface for defining pixel panels representing a substantially planar surface of said object by specifying a plurality of corresponding points on two images of said object in a sequence which forms a closed path around the planar surface;
   b. a processor for partitioning said pixel panels into discrete surface elements and for associating at least one bit map from an image with a respective discrete surface element for selective application to the surface element as part of a surface when rendering a surface on a wire frame.

8. Computer apparatus for rendering a surface on a wire frame representation of a 3-dimensional object for which a left image and a right image of the object is available, comprising:
   a. a user interface fr defining pixel panels representing a substantially planar surface of said object by specifying a plurality of corresponding points in left and right images of siad object in a sequence forming a closed path around the palanar surface; and
   b. a processor for partitioning said pixel panels into discrete surface elements, for defining a wireframe by calculating locations of each vertex of triangular surface elements in a 3-dimensional object space using left and right images, and for associating a bit map from either the left or right image with a corresponding discrete surface element for selective application to the surface element as part of a surface when rendering a surface on a wire frame depending on which of the bit maps is associated with a view more nearly perpendicular to the viewing plane.

9. Computer apparatus for rendering a surface on a wire frame representation of a 3-dimensional object for which at least one image of the object is availabel, comprising:
   a graphical user interface for defining pixel panels representing a substantially planar surface of said object by specifying a plurality of points on an image of said object in an order which forms a closed path around the planar surface; and
   a processor for partitioning said pixel panels into discrete surface elements and for associating at least one bit map from an image with a respective surface element for selective application to the surface element as part of a surface when rendering a surface on a wire frame.

10. Computer apparatus for rendering a surface on a wire frame representation of a 3-dimensional object for which at least two images of the object are available, comprising:

a. a graphical user interface for defining pixel panels representing a substantially planar surface of said object by specifying a plurality of corresponding points on said images of said object in an order which forms a closed path around the planar surface and storing location information for each point specified in a database; and b. a processor for partitioning said pixel panels into discrete surface element and for storing a pointer for one or more surface elements in said database to a bit map from an image for selective application to the surface element as part of a surface when rendering a surface on a wire frame.

* * * * *